US 8,147,576 B2

(12) United States Patent
Gillenberg et al.

(10) Patent No.: US 8,147,576 B2
(45) Date of Patent: Apr. 3, 2012

(54) FILTER ELEMENT HAVING SERRATED SEAL

(75) Inventors: Eric Gillenberg, Speyer (DE);
Klaus-Dieter Ruhland, Meckenheim (DE); Oliver Steins, Römerberg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 126 days.

(21) Appl. No.: 12/681,300

(22) PCT Filed: Oct. 2, 2008

(86) PCT No.: PCT/EP2008/063223
§ 371 (c)(1),
(2), (4) Date: May 25, 2010

(87) PCT Pub. No.: WO2009/047205
PCT Pub. Date: Apr. 16, 2009

(65) Prior Publication Data
US 2010/0229511 A1    Sep. 16, 2010

(30) Foreign Application Priority Data
Oct. 2, 2007   (DE) .................... 20 2007 014 822 U

(51) Int. Cl.
*B01D 50/00*    (2006.01)

(52) U.S. Cl. ............. 55/337; 55/498; 55/385.3; 55/490; 55/502; 55/495; 55/503; 55/504; 55/510; 210/248; 210/440; 210/450; 210/483

(58) Field of Classification Search .................... 55/337, 55/498, 385.3, 490, 502, 495, 503, 504, 510; 210/248, 440, 450, 483
See application file for complete search history.

(56) References Cited

U.S. PATENT DOCUMENTS

| 5,413,712 | A | * | 5/1995 | Gewiss et al. ................ 210/450 |
| 5,487,767 | A | * | 1/1996 | Brown ............................ 55/357 |
| 5,569,311 | A | * | 10/1996 | Oda et al. ........................ 55/493 |
| 5,702,602 | A | * | 12/1997 | Brown et al. ................. 210/342 |
| 5,730,769 | A | * | 3/1998 | Dungs et al. ................. 55/385.3 |
| 5,755,843 | A | * | 5/1998 | Sundquist .................... 55/385.3 |

(Continued)

FOREIGN PATENT DOCUMENTS
DE            19621860        12/1997
(Continued)

OTHER PUBLICATIONS

PCT search PCT/EP2008/063223; German patent office search DE 20 2007 014 822.4.

*Primary Examiner* — Jason M Greene
*Assistant Examiner* — Dung Bui

(57) ABSTRACT

The invention relates to a filter element consisting of a filter medium (10) that is pleated in a zigzag manner and has a concentric shape, and a first end disk (11) and a second end disk (12) disposed on an opposite front, wherein the end disk (12) has a concentric opening (13) and extends substantially annularly across the pleats of the filter medium. The end disk (11) has a ring collar (14) extending radially toward the outside. Said ring collar (14) has a seal (15) that surrounds the ring collar at least partially, wherein the seal has an axially extending region, which carries radially peripheral sealing lips (17), and said radially peripheral sealing lips are supported in a groove (18) or in a housing wall (19) of a housing receiving the filter element.

9 Claims, 2 Drawing Sheets

U.S. PATENT DOCUMENTS

| | | | |
|---|---|---|---|
| 5,893,937 A * | 4/1999 | Moessinger | 55/385.3 |
| 5,954,849 A * | 9/1999 | Berkhoel et al. | 55/498 |
| 6,179,890 B1 * | 1/2001 | Ramos et al. | 55/482 |
| 6,308,836 B1 * | 10/2001 | Guichaoua et al. | 210/440 |
| 6,447,567 B1 * | 9/2002 | Ehrenberg | 55/498 |
| 6,598,580 B2 * | 7/2003 | Baumann et al. | 123/198 E |
| 6,599,342 B2 * | 7/2003 | Andress et al. | 55/495 |
| 6,610,126 B2 * | 8/2003 | Xu et al. | 95/273 |
| 6,936,162 B1 * | 8/2005 | McKenzie | 210/130 |
| 6,966,940 B2 * | 11/2005 | Krisko et al. | 55/497 |
| 6,972,092 B1 * | 12/2005 | Roll | 210/313 |
| 7,303,673 B1 * | 12/2007 | Glazewski | 210/232 |
| 7,318,851 B2 * | 1/2008 | Brown et al. | 55/498 |
| 7,393,375 B2 * | 7/2008 | Xu et al. | 55/495 |
| 7,396,376 B2 * | 7/2008 | Schrage et al. | 55/498 |
| 7,396,377 B2 * | 7/2008 | Lampert et al. | 55/502 |
| 7,491,254 B2 * | 2/2009 | Krisko et al. | 55/337 |
| 7,608,184 B2 * | 10/2009 | Weindorf et al. | 210/234 |
| 7,658,777 B2 * | 2/2010 | Kopec et al. | 55/502 |
| 7,662,203 B2 * | 2/2010 | Scott et al. | 55/498 |
| 2002/0100720 A1 * | 8/2002 | Jainek | 210/248 |
| 2002/0112459 A1 * | 8/2002 | Andress et al. | 55/498 |
| 2003/0121242 A1 * | 7/2003 | Rieger et al. | 55/493 |
| 2005/0173328 A1 * | 8/2005 | Gutman et al. | 210/232 |
| 2005/0194312 A1 * | 9/2005 | Niemeyer et al. | 210/634 |
| 2005/0229561 A1 * | 10/2005 | Nepsund et al. | 55/481 |
| 2005/0229563 A1 | 10/2005 | Holzmann | |
| 2006/0091061 A1 * | 5/2006 | Brown | 210/440 |
| 2006/0091064 A1 * | 5/2006 | Brown et al. | 210/450 |
| 2006/0137316 A1 * | 6/2006 | Krull et al. | 55/498 |
| 2006/0157394 A1 * | 7/2006 | Luka et al. | 210/136 |
| 2006/0219626 A1 * | 10/2006 | Dworatzek et al. | 210/443 |
| 2007/0170101 A1 * | 7/2007 | Stanhope et al. | 210/130 |
| 2007/0186528 A1 * | 8/2007 | Wydeven et al. | 55/498 |
| 2007/0193929 A1 * | 8/2007 | Brown et al. | 210/90 |
| 2007/0235374 A1 * | 10/2007 | Wright et al. | 210/130 |
| 2007/0235375 A1 * | 10/2007 | Stanhope et al. | 210/130 |
| 2008/0035537 A1 * | 2/2008 | Klein et al. | 210/94 |
| 2008/0066435 A1 * | 3/2008 | Engel et al. | 55/492 |
| 2008/0110142 A1 * | 5/2008 | Nelson et al. | 55/357 |
| 2008/0276583 A1 * | 11/2008 | Munkel | 55/498 |
| 2010/0032359 A1 * | 2/2010 | Gillenberg et al. | 210/232 |
| 2010/0044295 A1 * | 2/2010 | Honermann et al. | 210/234 |

FOREIGN PATENT DOCUMENTS

| | | |
|---|---|---|
| DE | 19806929 | 8/1999 |
| DE | 10124612 | 11/2002 |
| EP | 0781586 | 7/1997 |

* cited by examiner

ID filed Oct. 2, 2008 designating the United States of America, the entire disclosure of which is incorporated herein by reference. Priority is claimed based on Federal Republic of Germany patent application no. 20 2007 014 822.4, filed Oct. 2, 2007.

FILTER ELEMENT HAVING SERRATED SEAL

CROSS REFERENCE TO RELATED APPLICATIONS

This application is US National Stage Entry of international patent application no. PCT/EP2008/063223, filed Oct. 2, 2008 designating the United States of America, the entire disclosure of which is incorporated herein by reference. Priority is claimed based on Federal Republic of Germany patent application no. 20 2007 014 822.4, filed Oct. 2, 2007.

TECHNICAL FIELD

The invention concerns a filter element and a filter system, especially for the intake air of an internal combustion engine.

PRIOR ART

U.S. Pat. No. 4,720,292 discloses an air filter having the following features: a housing with an axial outlet opening and a substantially open second end that is closable by a removable cover. On the circumference of the housing an air inlet opening is arranged. In the housing, there is a substantially cylindrical filter element with an internal support tube, a filter with an external support tube, wherein the filter element is coaxially arranged in the housing. The sealing action of the filter element on the housing is realized by an annular end plate that has a substantially cylindrical radially inwardly oriented surface and is pushed over an inner section of the outlet part.

It is well known that the filter inserts of air filters are exchanged after a certain operating time. Depending on the dust load, the service life of an air filter can be a few days (construction machinery) up to several months.

The filter insert disclosed in the aforementioned U.S. patent as well as other conventionally employed filter inserts are comprised of a combination of materials wherein in particular for the support tubes sheet steel is used. The filter medium is paper or a plastic nonwoven fabric. The end plates are comprised of plastic material, for example, of a soft elastomer.

Especially in case of frequent exchange of filter elements the reliable and process-safe sealing action of the filter element in a housing is important. The sealing action should be temperature-resistant and vibration-resistant. Even in facilities or devices that are exposed to strong vibrations or shocks, the sealing action of the filter element must be ensured. At the same time, the filter element itself however should have, if possible, no metallic elements so that it can be disposed of thermally without problems.

The invention has therefore the object to provide a filter element and a filter system with a high filtration property and a reliable sealing action between the area of the unfiltered and the area of the filtered medium. This object is solved by the features of the independent claim.

The decisive advantage of the invention resides in that by means of the configuration of the seal of the filter element with a V-shaped arrangement and a sealing groove arranged between the legs it is ensured that, on the one hand, a high sealing effect and, on the other hand, a good support action of the filter element in a housing can be achieved. Especially in case of use of plastic material and a sealing action on vibration-loaded elements a design is required that functions reliably even in case of extreme temperature fluctuations.

According to one embodiment of the invention, the end plate that supports the seal is comprised of a two-component plastic material. Of course, there is also the possibility of producing the end plate of individual elements. Essentially, a hard component is provided as a support. On it, an elastomer or a foamed plastic material in the form of a V-shaped seal is provided. There is also the possibility of producing the connection between the hard component and the filter medium with an elastomer or a foamed plastic material wherein this connecting component may also be produced by a two-component injection molding process.

The end plate can also be attached to the filter element by a hot-plate welding method. There is also the possibility of heating the end plate by infrared radiation and to embed the filter element into the heated thermoplastic material.

According to a further embodiment of the invention, the V-shaped seal is provided with stays. These stays rest against a sealing stay of the housing and improve the sealing action. Of course, instead of the stays sealing lips can also be selected.

According to a further embodiment, the V-shaped seal extends across the end faces of the double stay and provides in this way a defined contact of the filter element on a housing.

The invention concerns also a filter system with a filter element. This filter system serves in particular for filtration of the intake air of an internal combustion engine and is comprised of a housing and a cover for receiving the filter element.

The end plates can be produced also by a thixotropic application method. This means a metered application of the thixotropic material wherein simultaneously the sealing structure is formed without additional molds.

In an advantageous way, the filter system is provided with two annular grooves that in the area of the sealing action communicate with the sealing contour of the filter element.

According to a further embodiment, on the housing in the area of the inlet a cyclone or rotary flow separator is provided. It is comprised of guide ribs that impart a rotational movement or rotation to the medium. By means of this movement the dirt is guided outwardly and is removed at a suitable location by means of a dirt outlet.

These and further features are not only disclosed in the claims but also in the figure description in the figures.

BRIEF DESCRIPTION OF THE DRAWINGS

The invention will be explained in the following with the aid of an embodiment in more detail.

It is shown in.

EMBODIMENT(S) OF THE INVENTION

Figure 1:
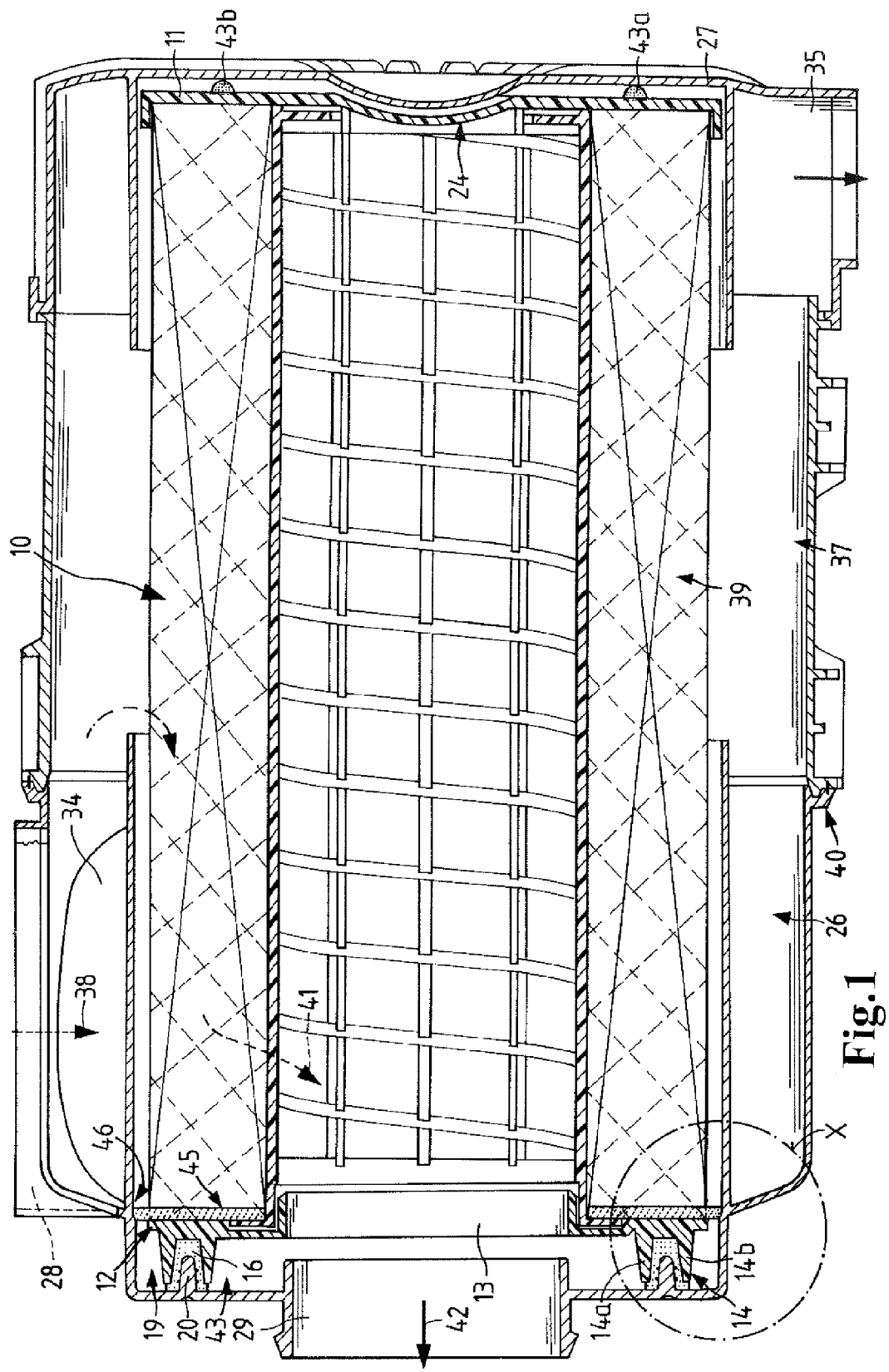
FIG. 1 a section view of a filter system.
Figure 2:
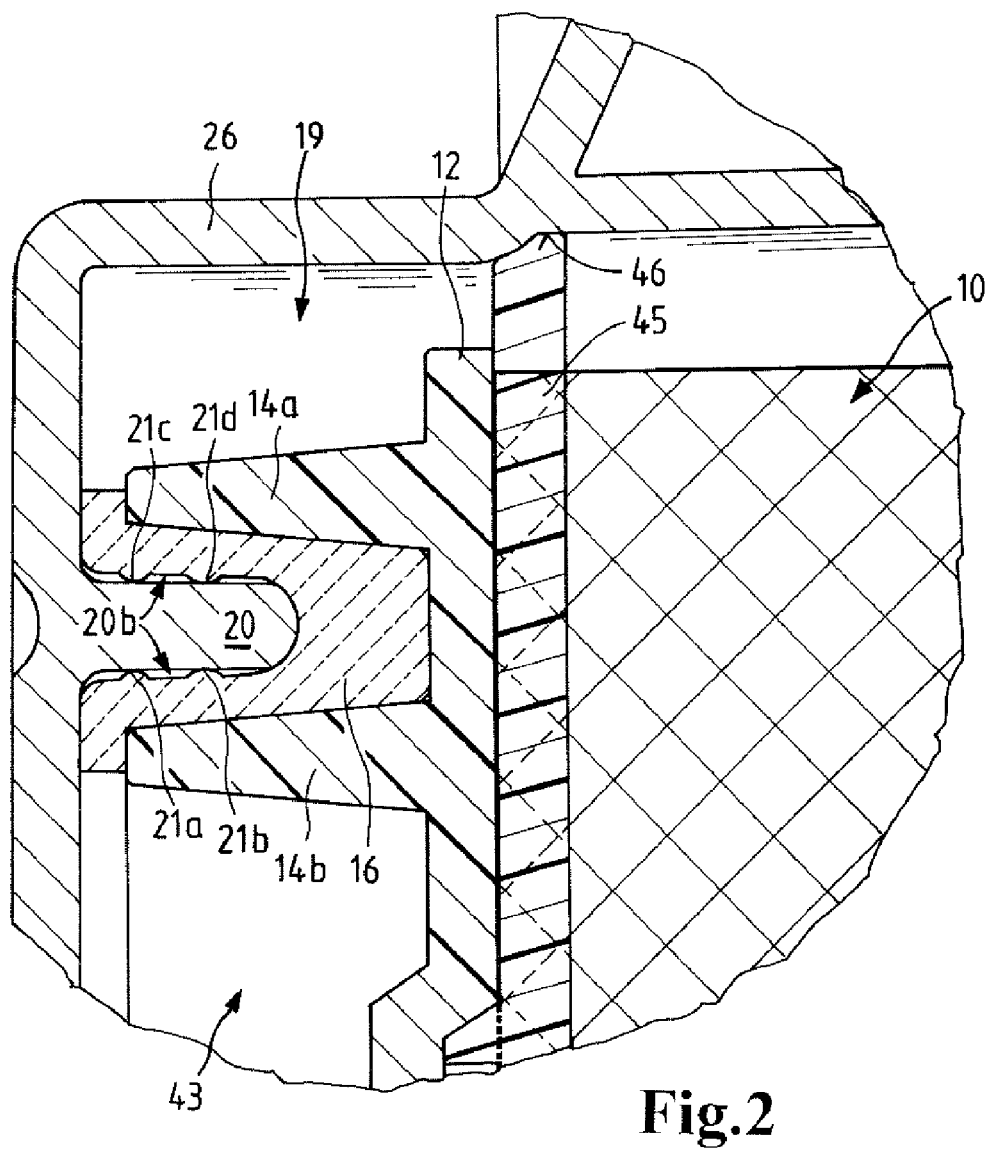
FIG. 2 the detail illustration in the sealing area of the filter housing.

The filter system according to FIG. 1 is comprised of a housing 26 that is substantially concentrically configured and has an inlet 28. The filter system serves for filtration of the intake air of an internal combustion engine. Through the inlet 28 the air to be purified is supplied according to arrow 38, flows through the cyclone preseparator 34 and a rotary flow is imparted thereby. As a result of this rotary flow particles that are contained in the air reach the outer housing wall and are carried from there to the exterior through a dirt outlet 35 that may be closed off by a suitable valve.

On the housing 26 a middle section 37 is arranged. The latter is also designed concentrically and is coupled to the housing in the area 40, for example, by means of a weld. On the middle section 37 there is a cover 27. The latter is detachably connected to the middle section by means of clamping closures or another suitable closure system. Cover, middle section, and housing together thus provide a closed system that has an outlet 29 for discharging the purified air.

Inside the complete system there is a filter element 39. The latter is comprised of a zigzag-folded filter medium 10 and is of a concentric shape. The end faces of the filter element 39 have end plates 11, 12. While the end plate 12 has a concentric opening 13, the other end plate 11 is closed by a closure member 24. The air to be purified flows according to arrow 41 through the filter element and, purified, according to arrow 42 through the outlet 29 to an internal combustion engine, not illustrated here.

The filter element has on the end plate 12 positioned at the left side a double stay 14. Between the two stays of the double stay a V-shaped seal 16 is arranged. This V-shaped seal extends with its two legs across the end faces of the double stay. It moreover has in the inner area of the two legs circumferentially extending sealing stays 21a to 21d. With them, the V-shaped seal encloses a sealing stay 20 of the housing 26 and generates in this way a sealing action between the raw air area (20) and the clean air area 43.

The end plate 12 is provided on the side that is opposite the V-shaped seal with polyurethane foam 45. In this polyurethane foam 45 the filter medium is embedded. The polyurethane foam itself extends up to the wall 46 of the housing 26 and forms together with this wall a seal for coarse dirt so that in the seal-relevant area 20 no coarse dirt can penetrate that would possibly impair the sealing function.

The filter element itself is supported in the area of the end plate 11 by means of support noses 43a, 43b at the cover 27 and ensures in this way a satisfactory axial force in the direction of the end plate 12 and thus provides a reliable sealing action.

The invention claimed is:

1. A filter element, comprising:
   a zigzag-folded filter medium (10) arranged in a tubular concentric shape;
   a first end plate (11) arranged at an axial end face of said concentric filter medium, said first end plate having a central portion that is either open or closed; and
   a second end plate (12) arranged at an opposing axial end face of said filter medium and having a concentric opening (13) therethrough;
   wherein said second end plate extends substantially in a circular shape about the folds of the filter medium; and
   wherein the end plate (12) has an axially outwardly extending double stay (14) as well as a V-shaped seal arranged between the stays (14a, 14b) which encloses the inwards axially circumferentially extending sealing stay (20) of a housing (26) receiving the filter element.

2. The filter element according to claim 1, wherein
   the end plate (12) is comprised of a two-component plastic part;
   the first component is a hard component; and
   the second component is an elastomer material;
   wherein said second component forms the V-shaped seal.

3. The filter element according to claim 2, wherein
   the elastomer material forms a connection between the hard component and the filter medium.

4. The filter element according to claim 1, said V-shaped seal further comprises
   interior sealing area stays (21a, 21b, 21c, 21d) projected into a grooved formed by said seal, said sealing area stays facing and abutting against the sealing stay (20) of the housing (26).

5. The filter element according to claim 1, wherein the V-shaped seal extends across end faces of the double stay.

6. The filter element according to claim 2, characterized in that the V-shaped seal is comprised of one or several of the following components: EPDM, TPE, silicone, PUR foam.

7. A filter system comprising:
   a filter element according to claim 1, the filter system further comprising:
   a housing (26) that is substantially concentrically configured and configured to receive said filter element therein;
   a cover (27) closing off the housing (26) that is also of a concentric configuration;
   an inlet (28) arranged on the housing and/or the cover, said inlet configured to supply medium to be filtered to the filter element;
   an outlet (29) concentrically arranged on said housing (26) and configured to discharge filtered medium; and
   a sealing contour arranged on an inner surface of said housing, said sealing contour in the form of an axially inwardly extending sealing stay (20) having a contact surface (44) which matches and is receivable into the V-shaped seal (16).

8. The filter system according to claim 7, wherein
   the sealing stay (20) has two parallel extending sealing surfaces (20a, 20b) and these surfaces are connected to one another by a slanted or rounded end face (20c).

9. The filter system according to claim 7, wherein
   in the area of the inlet (28) a cyclone separator (34) is provided and a dirt outlet (35) is arranged on the housing (26) or on the cover (27).

* * * * *